United States Patent [19]
Jo

[11] 4,010,008
[45] Mar. 1, 1977

[54] SUBSTITUTED NATURAL GAS VIA HYDROCARBON STEAM REFORMING

[75] Inventor: Hong-Kyu Jo, Des Plaines, Ill.

[73] Assignee: UOP Inc., Des Plaines, Ill.

[22] Filed: Mar. 1, 1976

[21] Appl. No.: 662,984

Related U.S. Application Data

[63] Continuation-in-part of Ser. No. 550,900, Feb. 18, 1975, abandoned.

[52] U.S. Cl. .................... 48/214 A; 48/197 R; 48/211; 252/373; 260/449 M
[51] Int. Cl.² .................... C10G 11/28; C10K 3/06
[58] Field of Search ......... 48/214 A, 197 R, 214 R, 48/211; 260/449 M; 252/373

[56] References Cited
UNITED STATES PATENTS

| | | | |
|---|---|---|---|
| 3,459,520 | 8/1969 | Percival | 48/214 A |
| 3,828,474 | 8/1974 | Quartulli | 48/214 A |
| 3,866,353 | 2/1975 | Krumm et al. | 48/214 A |
| 3,904,386 | 9/1975 | Graboski et al. | 48/197 R |
| 3,917,467 | 11/1975 | Toida et al. | 48/197 R |

Primary Examiner—Robert L. Lindsay, Jr.
Assistant Examiner—George C. Yeung
Attorney, Agent, or Firm—James R. Hoatson, Jr.; Robert W. Erickson; William H. Page, II

[57] ABSTRACT

A multiple-stage hydrocarbon steam reforming process for producing a methane-rich substitute natural gas. A portion of the first stage effluent is condensed, water is removed therefrom and the remainder is recycled to combine with the fresh charge stock to the first stage. Following one stage of methanation, or shift conversion, both steam and carbon dioxide are removed prior to effecting additional reactions in a second methanation stage.

7 Claims, 1 Drawing Figure

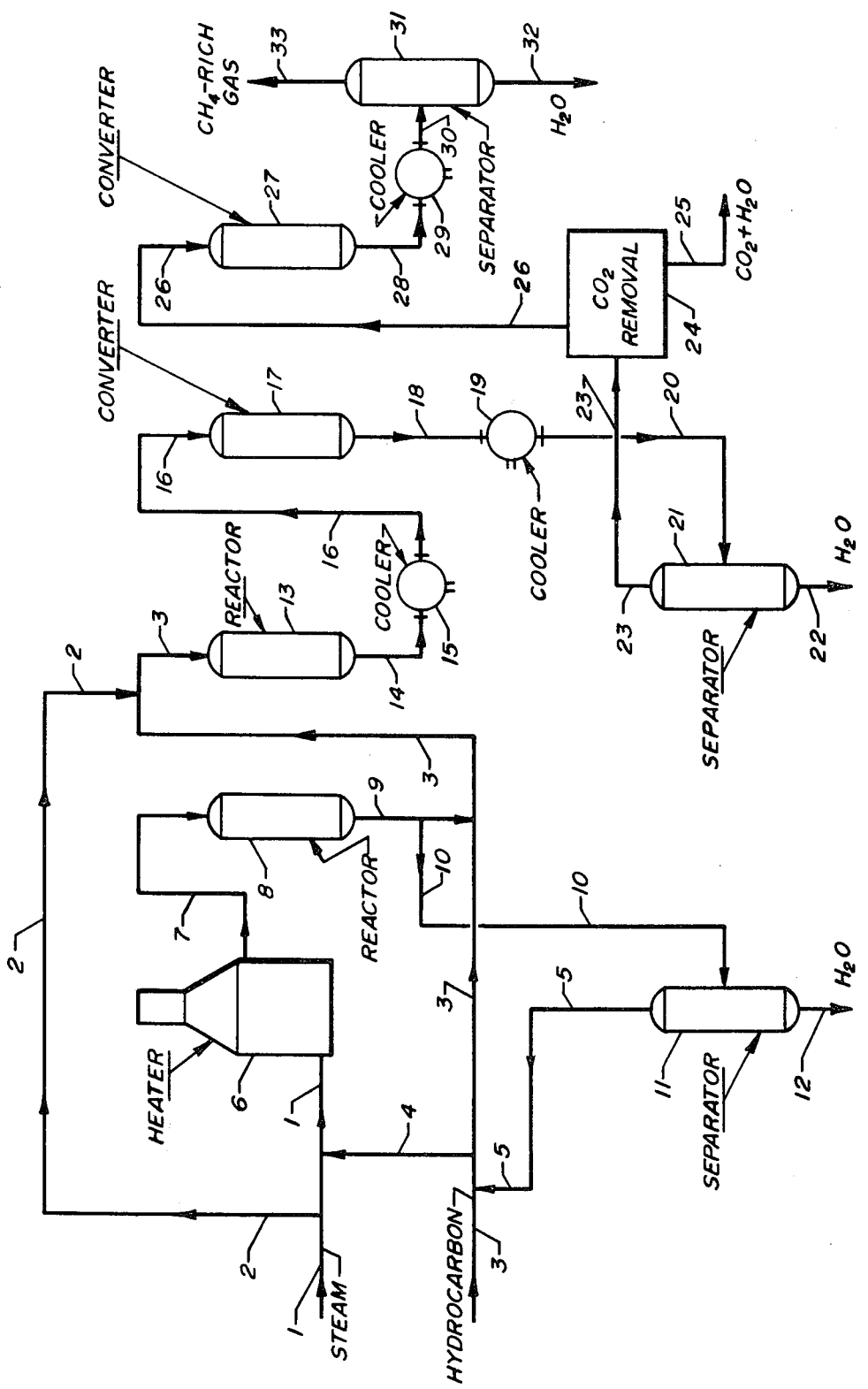

SUBSTITUTED NATURAL GAS VIA HYDROCARBON STEAM REFORMING

RELATED APPLICATION

This application is a Continuation-In-Part of my copending application, Serial Number 550,900, filed February 18, 1975, abandoned on the filing date of this application, all the teachings of which copending application are incorporated herein by specific reference thereto.

APPLICABILITY OF INVENTION

The inventive concept herein described is directed toward hydrocarbon steam reforming to produce a methane-rich gaseous product particularly well suited for direct use as a substitute natural gas (SNG). More specifically, the present invention involves a combination of steam reforming (gasification) and shift conversion (methanation), wherein the latter produces additional methane, from a principally vaporous mixture of methane, carbon monoxide, hydrogen, carbon dioxide and steam. Steam reforming of hydrocarbonaceous material, in the presence of steam, to produce lower-boiling normally gaseous products, is a process which, by modern-day standards, can be designated "ancient". For many years this process had been utilized to produce a methane-containing gaseous mixture for utilization as "town gas". In one respect, town gas is similar to natural gas; the major component of both streams is methane. However, the heating value of town gas, as measured in BTU per cubic foot, is significantly lower than that of natural gas, and, therefore, the former is not well suited for use as a direct alternative to natural gas. Current utilization of natural gas, or any substitute natural gas, requires a heating value of at least 900 BTU (226.80 kg. calories) per cubic foot. In addition, certain other characteristics are required for any gas used to replace directly natural gas, such as flame speed, oxygen requirement, etc. Town gas, having a heating value normally less than approximately 600 BTU (151.20 kg. calories) per cubic foot, is unsuitable for direct replacement from the standpoint of the heating value, the flame speed and oxygen requirement.

In recent years, the demand for natural gas has experienced an accelerating rate principally as a result of two considerations of major importance. Great interest has been generated with respect to the violence being perpetrated upon the atmosphere as a result of the combustion of various other fuels. The consequence has been an increasing world-wide reluctance to utilize high sulfur-containing coal and fuel oils, with more reliance being placed upon the use of natural gas rich in methane. Additionally, much concern is being directed toward the continued availability of our energy-bearing resources other than natural gas. These resources are inclusive of coal, crude oil and shale, as well as the lower boiling constituents derived therefrom — e.g. motor fuel gasoline.

Maintaining the current rate of natural gas use, while simultaneously recognizing that this rate is steadily increasing, will, according to those having the appropriate expertise, result in a virtually total depletion of the natural gas reserve within a period approximating 10 to 15 years. In an attempt to alleviate this adverse situation, more and more petroleum refiners, as well as gas producers, have turned to the relatively ancient technology of hydrocarbon steam reforming. This has given rise to many innovations in reforming technology, most of which have been centered around improved catalytic composites and processing techniques designed to afford an extended period of operation while producing maximum quantities of substitute natural gas from a given quantity of feedstock, and, simultaneously, with lower energy costs. It is to this end that the various objects and embodiments of the process encompassed by the present inventive concept are particularly directed.

OBJECTS AND EMBODIMENTS

One object of the present invention is to improve the efficiency of a process for producing additional methane from a principally vaporous mixture thereof with carbon monoxide, hydrogen, carbon dioxide and steam. A corollary objective is to improve upon a process for effecting steam reforming of hydrocarbons.

A principal object resides in extending the period of time during which a process for producing a methane-rich substitute natural gas functions acceptably and economically. A specific object of my invention is to provide a processing technique which decreases the extent to which carbon becomes deposited upon the catalyst employed in a hydrocarbon steam reforming process.

Therefore, in a broad embodiment, the present invention involves a multiple-stage process for producing a methane-rich substitute natural gas which comprises the sequential steps of: (a) reacting a first portion of a hydrocarbon charge stock with steam, in a first catalytic reaction zone, at steam reforming conditions including a temperature in the range of about 800° F. to about 1,025° F.; (b) removing at least about 90.0% of the steam from a first portion of the resulting first reaction zone effluent, and recycling at least a portion of the remainder of said first portion to said first reaction zone; (c) reacting a second portion of said hydrocarbon charge stock with a second portion of said first reaction zone effluent, in a second catalytic reaction zone, at steam reforming conditions including a temperature in the range of about 800° F. to about 1,025° F.; and, (d) recovering said methane-rich substitute natural gas from the resulting second reaction zone effluent.

A more limited embodiment of my invention is directed toward a multiple-stage process for producing a substitute natural gas which comprises the sequential steps of: (a) reacting a first portion of a hydrocarbon charge stock with steam in a first catalytic reaction zone, at steam reforming conditions including a temperature in the range of about 800° F. to about 1,025° F.; (b) removing at least about 90.0% of the steam from a first portion of the resulting first reaction zone effluent, and recycling at least a portion of the remainder of said first portion to said first reaction zone; (c) reacting a second portion of said hydrocarbon charge stock with a second portion of said first reaction section zone effluent, in a second catalytic reaction zone, at steam reforming conditions including a temperature in the range of about 800° F. to about 1,025° F.; (d) reacting at least a portion of the resulting second reaction zone effluent, in a third catalytic reaction zone, at methanation conditions including a temperature in the range of about 450° F. to about 800° F.; (e) removing steam and at least 85.0% of the carbon dioxide from the resulting third reaction zone effluent; (f) further reacting at least a portion of the remainder of said third reaction zone effluent, reduced in carbon dioxide content, in a fourth catalytic reaction zone, at methanation conditions including a temperature in the range of about 450° F. to about 800° F.; and, (g) removing steam from the resulting fourth reaction zone effluent.

Other objects and embodiments relating to the present inventive concept will become evident from the following additional description of the process. In one such other embodiment, steam is introduced into the second gasification reaction zone in admixture with the effluent from the first gasification reaction zone.

PRIOR ART

Candor compels recognition and acknowledgment of the fact that the prior art is replete with a wide variety of publications directed toward the steam reforming of hydrocarbonaceous material. Any attempt herein to exhaustively delineate the steam reforming art would constitute an exercise in futility. However, it is believed that a brief description of several U.S. patents, and a comparison thereof with the process herein described, will serve to define the area to which the present invention is principally directed.

U.S. Pat. No. 3,459,520 (Cl. 48–214) discloses the production of vaporous methane-containing products from various petroleum distillates. In this process, an aliquot portion of the gasification reaction zone effluent vapors is recycled to the gasification reaction zone. Clearly it is intended that the portion so recycled conforms to the accepted definition of aliquot; that is, what is recycled is of the same composition as the reaction zone effluent. In accordance with the present invention, at least 90.0% of the steam in the recycled portion is removed before introduction thereof into the gasification reaction zone.

U.S. Pat. No. 3,511,624 (Cl. 48–197) discloses the multiple-stage methanation of a gaseous stream containing steam, carbon monoxide, carbon dioxide, hydrogen and methane. In this process, steam is removed from the first stage methanation effluent, prior to introducing the same into the second methanation stage; however, carbon dioxide is not removed between methanation stages. U.S. Pat. No. 3,744,981 (Cl. 48–214) involves steam reforming of hydrocarbon charge stocks to produce a methane-rich gaseous product suited for utilization as a substitute natural gas. A portion to the first gasification reaction zone effluent is reacted in a separate reaction zone at hydrogen-producing conditions, with the total product therefrom being recycled to the first reaction zone.

The steam reforming process disclosed in U.S. Pat. No. 3,866,353 (Cl. 48–214), consists of two gasification reaction zones, a single methanation zone and a carbon dioxide scrubber. The effluent from the first gasification zone is passed in total into the second reaction zone, in admixture with additional steam and hydrocarbon charge stock. Water is removed from the second reaction zone effluent, prior to the introduction thereof into the single methanation reaction zone, the effluent from which is scrubbed from carbon dioxide removal. Noteworthy is the fact that no part of the first gasification zone effluent (or even that from the second zone) is recycled to the first. Also, there is no carbon dioxide removal prior to effecting the methanation reactions.

U.S. Pat. No. 3,917,467 (Cl. 48–197R) is illustrative of a two-stage shift conversion system having water and carbon dioxide removal between stages. Aside from an almost passing reference to the fact that the methanation charge stock emanates from a gasification system there exists no disclosure of gasification techniques, and no recognition of 90.0% water removal from a portion of the first gasification reaction zone effluent.

Briefly, in accordance with the present invention and in contrast to the foregoing, a portion of the effluent from the first gasification reaction zone is cooled and introduced into a separation zone for the removal of water therefrom. More than 90.0% (on a mole basis) of the steam in the portion of the first gasification reaction zone effluent is removed in this fashion, prior to combining the remainder with the fresh charge stock mixture to the first gasification reaction zone. In the specific illustration hereinafter set forth, about 99.5% water removal is achieved.

With respect to the methanation section of the present process, the effluent from the first methanation stage is cooled and condensed, and separated from water removal, followed by introduction of the remainder into carbon dioxide removal facilities prior to introducing the same into the second methanation stage. Carbon dioxide removal generally exceeds 85.0%; in the specific embodiment hereinafter described, about 93.0% of the carbon dioxide is removed prior to effecting the second stage methanation reactions.

SUMMARY OF INVENTION

The present invention encompasses a process for the catalytic conversion of hydrocarbons through the reforming thereof in the presence of steam. The principal function of the present process is the production of normally gaseous material, and particularly a methane-rich SNG end product. Suitable charge stocks, from which high yields of methane will be obtained, include normally gaseous components such as ethane, propane, and butane; a normally liquid light naphtha having an end boiling point in the range of about 250° F. (121° C.) to about 300° F. (149° C.); and, a normally liquid heavy naphtha having an initial boiling point of about 250° F. (121° C.) to about 300° F. (149° C.) and an end boiling point of about 400° F. (240° C.) to about 450° F. (232° C.). Other suitable charge stocks constitute mixtures of both normally gaseous and normally liquid components — e.g. a light straight-run naphtha containing ethane, propane, and butane.

As is well known in the prior art, the greater proportion of suitable steam reforming catalytic composites are sensitive to the presence of sulfurous compounds in the charge stock, and are known to deactivate as a result thereof. Therefore, in the following discussion, it will be presumed that the charge stock to the present process has previously been subjected to some form of hydrotreating, or hydrorefining, where necessary, in order to convert the sulfurous compounds into hydrogen sulfide and hydrocarbons, and that the resulting hydrogen sulfide has been removed prior to the hydrocarbons being charged to the present process. In short, suitable charge stocks should contain less than about 25 ppm. by weight of sulfurous compounds, and preferably less than about 10.0 ppm., calculated as elemental sulfur. One particular suitable hydrorefining treatment involves the utilization of a cobalt-molybdenum catalyst at a maximum catalyst bed temperature in the range of about 600° F. (315° C.) to about 850° F. (454° C.). Other operating conditions include a pressure of from 250 psig. (18.01 atm.) to about 1500 psig. (103.07 atm.), a liquid hourly space velocity of about 0.1 to about 10.0 and a hydrogen concentration ranging from about 100 to about 1500 scf./Bbl. The resulting hydrogen sulfide may be removed from the hydrocarbon stream in any suitable manner including stripping, absorption over a zinc oxide absorbent, etc. It is clearly understood that the hydrorefining pretreatment forms no essential part of my invention, and any suitable technique for reducing the sulfur content to less than about 25.0 ppm. by weight will suffice.

Encompassed by the present invention, is a multiple-stage process for the production of a methane-rich, substitute natural as. As such, the process involves two distinctly individual sections, each of which is preferably multiple-stage. The first section, which converts the hydrocarbonaceous feed stock, via catalytic steam reforming reactions, is herein referred to as the "gasification" section. Varying quantities of hydrogen, methane, carbon monoxide, carbon dioxide and steam constitute the product effluent from the gasification section and serve as the feed to the second multiple-stage section of the process. The principal function of the latter is to effect an enrichment of the gasification product effluent with respect to the quantity of methane. To this end, a multiplicity of shift converters are utilized, and this section is herein referred to as the "methanation" section. It is understood that this term is used in its most broad sense to include water and carbon dioxide removal. Preferably, the present invention involves the removal of both water and carbon dioxide intermediate the methanation reaction zones; at least about 85.0% of the carbon dioxide present in the effluent from the first methanation zone is removed prior to introducing the remainder of the effluent into the second methanation reaction zone.

The substantially sulfur-free charge stock is admixed with steam in an amount to result in a steam/carbon ratio in the range of about 1.1 to about 6.0, and preferably from about 1.3 to about 4.0. As hereinafter indicated in a specific illustration, a portion of the steam being introduced is diverted and admixed with a portion of the product effluent from the first gasification reaction zone, and introduced therewith into the second gasification reaction zone. Therefore, the steam/carbon ratio is herein defined as the total quantity of steam to the total quantity of carbon which is processed in the gasification section. Steam reforming reactions are effected at a temperature in the range of about 800° F. (426° C.) to about 1025° F. (552° C.), and preferably from about 825° F. (441° C.) to about 1000° F. (538° C.). These temperatures allude to the maximum catalyst bed temperature experienced within a given reaction zone. Reactions will be effected at a pressure in the range of about 250 psig. (18.01 atm.) to about 1500 psig. (103.07 atm.), preferably having an upper limit of about 1000 psig. (69.05 atm.). Since the reactant stream flows serially through the plurality of individual reaction zones, a slight pressure drop will be experienced with respect to subsequent, or downstream reaction vessels.

A wide variety of steam reforming catalytic composites are well known, and have been thoroughly described in the appropriate literature. In general, these catalysts utilized metallic components which are selected from Group VI-B and the iron-group of the Periodic Table, including chromium, molybdenum, tungsten, nickel, iron and cobalt. Also thoroughly disclosed within the prior art are the benefits accruing through the utilization of catalytic promoters selected from alkali and alkline-earth metals, including lithium, sodium, potassium, rubidium, beryllium, magnesium, clacium, strontium and barium. These catalytic components are usually combined with a suitable refractory inorganic oxide carrier material, either synthetically-prepared, or naturally occurring. Suitable porous carrier material includes kieselguhr, kaolin, alumina, silica, zirconia, boria, hafnia, etc., and mixtures thereof. One particularly suitable and preferred steam reforming catalyst is that described in U.S. Pat. No. 3,429,680 (Cl. 48–214), which catalyst utilizes a carrier material of kieselguhr and a catalytically active nickel component promoted through the use of a copper-chromium, or copper-chromium-manganese complex, and which may, or may not be further promoted through the addition of an alkaline-earth metal oxide. This particular catalyst is preferred since it appears to possess an unusually high degree of sulfur tolerance.

A portion of the hot effluent from the first gasification reaction zone, generally in the amount of about 10.0% to about 50.0% thereof, with a preferred upper limit of about 30.0%, is diverted, condensed and introduced into a separation zone for the removal of steam (water) therefrom. Preferably, more than about 90.0% of the steam is removed prior to recycling the portion in admixture with the charge stock/steam stream being introduced into the first gasification reaction zone. The remainder of the effluent is admixed with additional steam and a portion of the hydrocarbon charge stock, and introduced into the second gasification reaction zone at a pressure slightly lower than that imposed upon the first reaction zone as a result of fluid flow through the system. The additional steam is generally about 5.0% to about 30.0% (on a mole basis) of the total quantity of steam utilized in the gasification section. The effluent from the first gasification reaction zone comprises about 10.3% hydrogen; following the removal of steam, the hydrogen concentration increases to about 16.9%. Recycling this substantially steam-free effluent portion, to combine with the hydrocarbon feed stream, eliminates the necessity for off-site hydrogen plants otherwise required for reducing the rate at which carbonaceous matter becomes deposited upon the catalyst. As shown in the specific illustrative embodiment hereinafter set forth, the recycled stream may be split between the two reactors constituting the gasification section. In another embodiment, all of the recycled stream is introduced into the first gasification reaction zone.

The vaporous effluent from the gasification section constitutes the feed to the methanation section. Since the methanation reactions are effected at lower maximum catalyst bed temperatures, the gasification effluent will be cooled to a temperature in the range of about 450° F. (232° C.) to about 800° F. (426° C.), and introduced into the first methanation reaction zone. The catalytic composite disposed in the plurality of stages constituting the methanation section may be identical to that used in the gasification section. The reactions being effected within the methanation section are also exothermic; therefore, the effluent from the first methanation reaction zone will be cooled and introduced into a suitable separation zone from which steam will be removed. The temperature and pressure of the material entering the separation zone will be such that from about 30.0% to about 80.0% of the steam in the first methanation zone effluent will be removed; preferably, a minimum of about 50.0% is withdrawn from the process. The remainder of the first reaction zone effluent is then introduced into suitable carbon dioxide removal facilities wherein at least about 85.0% (on a mole basis) of the carbon dioxide is removed. In most carbon dioxide removal facilities, additional steam will be removed prior to introducing the remainder of the first methanation zone effluent into the second methanation zone. Removal of carbon dioxide may be effected in any manner well known and described in the prior art. One such conventional technique involves monoethanolamine absorption. Another absorption scheme utilizes hot potassium carbonate, while still another suitable operation utilized a catalytic reaction system employing vanadium pentoxide as the catalyst. Following the removal of water and carbon dioxide, the effluent is introduced into the second methanation reaction zone for additional conversion of hydrogen and carbon oxides into methane and water. The effluent from the second methanation reaction zone is cooled and introduced into a separation zone for the removal of additional water.

DESCRIPTION OF DRAWING

In the accompanying drawing, the illustrated embodiment is presented by way of a simplified flow diagram in which many details as pumps, instrumentation and controls, heat-exchange and heat-recovery circuits, start-up lines, compressors, valving and similar hardware have been omitted as being non-essential to a complete understanding of the techniques involved. The utilization of these miscellaneous appurtenances, to modify the process, are well within the purview of those possessing expertise in the appropriate technology. For the purpose of demonstrating the illustrative embodiment, the drawing will be described in conjunction with a commercial unit designed for the steam reforming of a propane-rich concentrate. It is understood that the charge stock, stream compositions, operating conditions, separators, reactors and the like are exemplary only, and may be varied widely without departing from the spirit of my invention, the scope of which is defined by the appended claims.

This particular steam reforming process is intended to produce maximum quantities of methane-rich SNG from approximately 16,800 Bbl./day (111.28 M³/hr.) of the charge stock; the molecular weight is 44.2, and the charge stock contains 1.18% by volume of ethane, 96.63% propane and 2.19% normal butane.

The propane-rich charge stock, having been previously subjected to catalytic hydrorefining for sulfur removal, is introduced into the process, in an amount of 2,826.34 lb-moles/hr. (1,284.70 kg-moles/hr.), by way of line 3. Steam, in the total amount of 6,682.97 lb-moles/hr. (3,037.71 kg-moles/hr.), is introduced in line 1; therefore, the total steam/carbon ratio approximates 2.36:1.0. A portion of the steam, about 791.65 lb-moles/hr. (359.84 kg-moles/hr.) (11.85%), is diverted from line 1 via line 2, and introduced into gasification reaction zone 13. A recycled gaseous phase from line 5 (about 17.0% hydrogen), the source and composition of which are hereinafter set forth, in an amount of 1,006.80 lb-moles/hr. (457.64 kg-moles/hr.), is admixed with the hydrocarbon charge in line 3. About 50.0% of the resulting mixture is diverted through line 4 to combine with that portion of the steam not being diverted through line 2. The total feed stream is introduced into heater 6 at a temperature of about 525° F. (274° C.) and a pressure approximating 372 psig. (26.31 atm.). Heated charge stock is withdrawn by way of line 7, at a temperature of about 910° F. (488° C.), and introduced thereby into first gasification reaction zone 8 at a pressure of about 330 psig. (23.46 atm.). A component analysis of the reactant stream charged to reactor 8 is presented in the following Table I:

TABLE I

| Component | Reactor 8 Charge Analysis Lb-Moles/Hr. | Percent |
|---|---|---|
| Water | 5892.82 | 75.47 |
| Carbon Monoxide | 4.90 | 0.06 |
| Carbon Dioxide | 87.00 | 1.11 |
| Hydrogen | 85.00 | 1.09 |
| Methane | 325.00 | 4.16 |
| Ethane | 16.75 | 0.21 |
| Propane | 1365.53 | 17.49 |
| Butane | 30.89 | 0.41 |

With respect to the recycled phase in line 5, illustrated as being combined with the propane charge in line 3, prior to a portion thereof being diverted through line 4, in many situations, particularly with heavier hydrocarbons, the total quantity will be introduced into gasification reactor 8.

The catalytic composite, disposed within gasification reactor 8, comprises a carrier material of kieselguhr, about 38.0% by weight of a nickel component (calculated as elemental nickel), about 9.0% by weight of magnesium oxide and about 7.5% by weight of a copper-chromium-manganese component in which the copper to chromium to manganese mole ratio is 1.0:1.0:0.1. The gasification reaction product effluent is withdrawn from reactor 8 through line 9 at a pressure of about 323 psig. (22.98 atm.) and a temperature of about 966° F. (518° C.), and in the amount of about 9,713.81 lb-moles/hr. (4,415.37 kg-moles/hr.). An aliquot portion thereof, about 1,748.48 lb-moles/hr. (794.76 kg-moles/hr.) (18.0%), is diverted through line 10, and introduced into separator 11 at a temperature of 120° F. (49° C.) and a pressure of about 263 psig. (18.9 atm.). A condensate stream, containing about 99.5% of the steam diverted through line 10, is removed from the process by way of line 12. The vaporous phase in line 5 is compressed and admixed with the propane-rich charge stock in line 3 as aforesaid. A component analysis of the effluent from reactor 8, and the separation effected in separator 11, are presented in the following Tables II and III, respectively:

TABLE II

| Component | Reactor 8 Effluent Component Analysis Lb-Moles/Hr. | Percent |
|---|---|---|
| Water | 4039.19 | 41.58 |
| Carbon Monoxide | 57.39 | 0.59 |
| Carbon Dioxide | 987.22 | 10.16 |
| Hydrogen | 1004.06 | 10.34 |
| Methane | 3625.95 | 37.33 |

TABLE III

| Component, Lb-Moles/Hr. | Separator 11 Water Removal Line 10 | Line 5 |
|---|---|---|
| Water | 727.05 | 3.0 |
| Carbon Monoxide | 10.33 | 9.8 |
| Carbon Dioxide | 177.70 | 174.0 |
| Hydrogen | 180.73 | 170.0 |
| Methane | 652.67 | 650.0 |

The remainder of the effluent from reactor 8, in the amount of 7965.33 lb-moles/hr. (3,620.60 kg-moles/hr.), continues through line 9, and is admixed with the second 50.0% portion of the hydrocarbon feed in line 3. Steam, in the amount of 791.65 lb-moles/hr. (359.84 kg-moles/hr.), is added thereto via line 2, having been diverted from line 1. The reactant mixture is introduced into the second gasification reaction zone 13 at a temperature of about 840° F. (449° C.) and a pressure of 321 psig. (22.84 atm.). In the present illustration, the catalytic composite disposed in reactor 13 is identical to that previously described with respect to reactor 8. While this type of composite is preferred, it is understood that the precise character thereof is not essential to the process encompassed by my inventive concept. The product effluent is withdrawn from reactor 13 via line 14, at a temperature of 976° F. (523° C.) and a pressure of about 313 psig. (22.98 atm.). Component analyses of the charge to, and effluent from reactor 13 are presented in the following Table IV:

TABLE IV

| Component, Lb-Moles/Hr. | Reactor 13 Component Analyses Charge | Effluent | Effluent, % |
|---|---|---|---|
| Water | 4105.29 | 2678.21 | 21.96 |
| Carbon Monoxide | 51.96 | 144.27 | 1.18 |
| Carbon Dioxide | 896.52 | 1563.91 | 12.82 |
| Hydrogen | 908.33 | 1016.91 | 8.34 |
| Methane | 3298.28 | 6792.24 | 55.70 |
| Ethane | 16.75 | — | — |
| Propane | 1365.53 | — | — |
| Butane | 30.89 | — | — |

The effluent from the second gasification reactor 13, being withdrawn via line 14, is introduced into cooler 15, wherein the temperature is decreased to about 560° F. (293° C.). Cooler 15 can function as a steam generator utilizing various refinery condensate streams. For example, steam can be generated from the water removed in line 22, and utilized as a portion of the process steam in line 1. The thus-cooled effluent is introduced, via line 16, into a first methanation reaction zone 17. Although any catalyst, capable of effecting the reaction of hydrogen with carbon monoxide and carbon dioxide, may be utilized in reactor 17, a preferred catalytic composite is that of nickel/kieselguhr containing magnesium oxide and a copper-chromium-manganese complex, as previously described with respect to the gasification section. The shift methanation effluent is withdrawn via line 18, at a temperature of about 705° F. (374° C.) and a pressure of about 303 psig. (21.62 atm.). A component analysis of the effluent from methanation zone 17 is presented in the following Table V:

TABLE V

| Component | Methanation Zone 17 Effluent Analysis Lb-Moles/Hr. | Percent |
|---|---|---|
| Water | 2982.05 | 25.37 |
| Carbon Monoxide | 7.54 | 0.06 |
| Carbon Dioxide | 1480.32 | 12.60 |
| Hydrogen | 269.99 | 2.30 |
| Methane | 7012.55 | 59.67 |

After being used as a heat-exchange medium in other areas of the process, the methanation zone 17 effluent is introduced, via line 18, into cooler 19 at a temperature of 705° F. (374° C.) and a pressure of about 300 psig. (21.41 atm.). The thus-cooled effluent is introduced into separator 21, by way of line 20, at a temperature of about 260° F. (127° C.) and a pressure of 297 psig. (21.21 atm.). Separator 21 serves to remove steam (water) from the effluent, prior to the introduction thereof into the second reactor of the methanation section; in the embodiment illustrated, 1861.24 lb-moles/hr. (846.02 kg-moles/hr.) of water are removed via line 22, the remainder of the effluent being introduced through line 23 into carbon dioxide removal system 24. Separator 21 is maintained at conditions resulting in the removal of from 30.0% to 80.0%, preferably at least 50.0%, of the steam in the effluent from methanation zone 17; in the present illustration, approximately 62.4% steam removal is effected.

In carbon dioxide removal system 24, both carbon dioxide and additional steam are removed from the process by way of line 25. With respect to the remaining portion of the first methanation zone effluent withdrawn via line 26, 93.9% of the carbon dioxide has been removed and 96.7% of the steam. The component analysis of the material in line 26, being introduced into the second methanation reaction zone 27, is presented in the following Table VI:

TABLE VI

| Component | Converter 27 Charge Analysis Lb-Moles/Hr. | Percent |
|---|---|---|
| Water | 100.00 | 1.33 |
| Carbon Monoxide | 7.54 | 0.10 |
| Carbon Dioxide | 103.00 | 1.37 |
| Hydrogen | 269.99 | 3.61 |
| Methane | 7012.55 | 93.59 |

The material in line 26 is introduced into methanation reaction zone 27 at a temperature of about 550° F. (288° C.) and a pressure approximating 286 psig. (20.46 atm.). As previously described with respect to gasification reactor 8, the catalyst, disposed in converter 27, is a composite of nickel and kieselguhr containing magnesium oxide and a copper-chromium-manganese complex. The product effluent, at a temperature of 598° F. (314° C.) and a pressure of about 281 psig. (20.12 atm.) is introduced into cooler 29 by way of line 28. The effluent analysis is presented in the following Table VII:

TABLE VII

| Component | Methanation Zone 27 Effluent Analysis Lb-Moles/Hr. | Percent |
|---|---|---|
| Water | 201.67 | 2.73 |
| Carbon Monoxide | 0.39 | Trace |
| Carbon Dioxide | 55.66 | 0.76 |
| Hydrogen | 59.39 | 0.80 |
| Methane | 7067.03 | 95.71 |

It will be noted that the two-stage methanation section of the present process is effected "wet" in the first reactor and "dry" in the second, with both steam and carbon dioxide being removed therebetween. As contrasted to a "wet-wet" methanation system, which requires significantly more catalyst in the second zone, and in which it is extremely difficult to recover a product gas containing less than 1.0% hydrogen, the present process used only about 60.0% of the catalyst in the second stage, and readily affords less than 1.0% hydrogen in the product gas. Removal of carbon dioxide, to the extent of at least about 85.0%, significantly decreases the burden imposed upon the second stage of the methanation section. As hereinbefore indicated, about 93.0% of the carbon dioxide and 96.7% of the steam are removed between methanation stages.

The effluent vaporous phase from second methanation reaction zone 27, is introduced into cooler 29, via line 28, wherein the temperature is decreased to a level of about 140° F. (60° C.). Cooled effluent is introduced by way of line 30, into separator 31 at a pressure of about 273 psig. (19.58 atm.). Water, in the amount of about 128.55 lb-moles/hr. (58.43 kg-moles/hr.) is withdrawn via line 32. Product gas, in the amount of about 7255.59 lb-moles/hr. (3297.99 kg-moles/hr.) containing about 73.12 lb-moles/hr. (33.24 kg-moles/hr.) of water, is withdrawn through line 33 and transported thereby to a product gas drying section (not illustrated). The dried methane-rich SNG, in the amount of 7182.47 lb-moles/hr. (3264.76 kg-moles/hr.), contains only a trace amount of carbon monoxide, about 0.77% carbon dioxide, 0.83% hydrogen and 98.40% methane. It is, therefore, directly suitable as a substitute for natural gas.

The foregoing clearly illustrates the process encompassed by my inventive concept and indicates the benefits afforded through the utilization thereof.

I claim as my invention:

1. A multiple-stage process for producing a methane-rich substitute natural gas which comprises the sequential steps of:
   a. reacting a first portion of a fluid hydrocarbon charge stock with steam, in a first catalytic reaction zone, at steam reforming conditions including a temperature in the range of about 800° F. to about 1,025° F.;
   b. removing at least about 90.0% of the steam from a first portion of the resulting first reaction zone effluent, and then recycling the substantially steam-free first portion to said first reaction zone;
   c. reacting a second portion of said fluid hydrocarbon charge stock with steam and a second portion of said first reaction zone effluent, in a second catalytic reaction zone, at steam reforming conditions including a temperature in the range of about 800° F. to about 1,025° F.; and,
   d. recovering said methane-rich substitute natural gas from the resulting second reaction zone effluent.

2. The process of claim 1 further characterized in that steam is added to the second portion of said hydrocarbon charge stock and introduced therewith into said second reaction zone.

3. The process of claim 1 further characterized in that said first and second reaction zones contain a catalytic composite comprising a carrier material and an iron-group metallic component.

4. The process of claim 1 further characterized in that said hydrocarbon charge stock is normally vaporous.

5. The process of claim 1 further characterized in that said hydrocarbon charge stock is normally liquid and boils in the light naphtha boiling range.

6. The process of claim 1 further characterized in that said hydrocarbon charge stock is normally liquid and boils in the heavy naphtha boiling range.

7. A multiple-stage process for producing a substitute natural gas which comprises the sequential steps of:
   a. reacting a first portion of a fluid hydrocarbon charge stock with steam in a first catalytic reaction zone, at steam reforming conditions including a temperature in the range of about 800° F. to about 1,025° F.;
   b. removing at least about 90.0% of the steam from a first portion of the resulting first reaction zone effluent, and then recycling the substantially steam-free first portion to said first reaction zone;
   c. reacting a second portion of said fluid hydrocarbon charge stock with steam and a second portion of said first reaction section zone effluent, in a second catalytic reaction zone, at steam reforming conditions including a temperature in the range of about 800° F. to about 1,025° F.;
   d. reacting at least a portion of the resulting second reaction zone effluent, in a third catalytic reaction zone, at methanation conditions including a temperature in the range of about 450° F. to about 800° F.;
   e. removing steam and at least 85.0% of the carbon dioxide from the resulting third reaction zone effluent;
   f. further reacting at least a portion of the remainder of said third reaction zone effluent, reduced in carbon dioxide content, in a fourth catalytic reaction zone, at methanation conditions including a temperature in the range of about 450° F. to about 800° F.; and,
   g. removing steam from the resulting fourth reaction zone effluent.

* * * * *